PROUTY & MEARS.
Plow.
No. 922.
Patented Sept. 15, 1838.
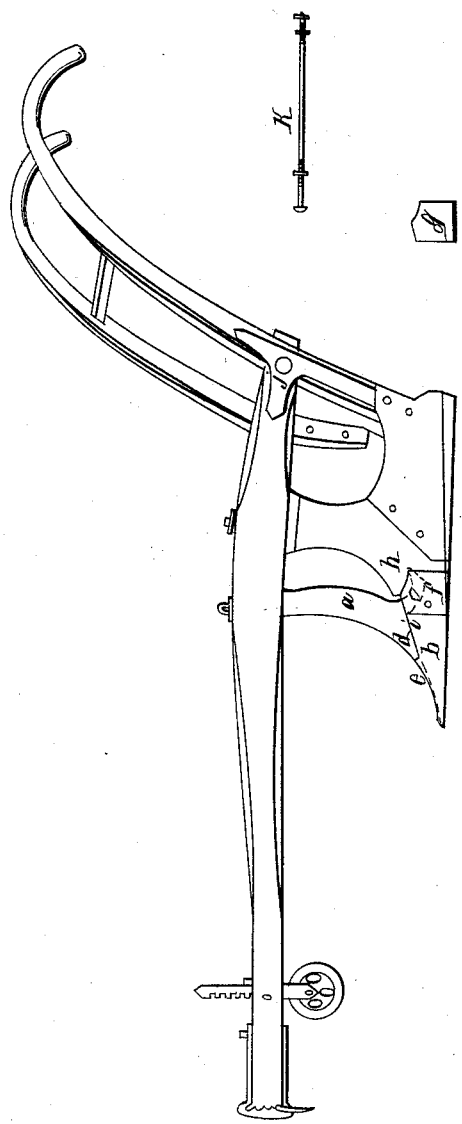

UNITED STATES PATENT OFFICE.

DAVID PROUTY, OF BOSTON, AND JOHN MEARS, OF DORCHESTER, MASS.

IMPROVEMENT IN PLOWS.

Specification forming part of Letters Patent No. 922, dated September 15, 1838.

*To all whom it may concern:*

Be it known that we, DAVID PROUTY, of Boston, in the county of Suffolk, State of Massachusetts, and JOHN MEARS, of Dorchester, county of Norfolk, and State aforesaid, have invented a new and useful Improvement in the Construction of Plows; and we do hereby declare that the following is a full and exact description of the construction and operation of the improvement on the said machine as invented and improved by us.

Heretofore the locked colter $a$ has been connected with the plow by the hook $c$ on its lower corner passing through a hole in the share and mold-board, and its front lower edge fitted into a groove in the top of the share, extending forward and terminating in a slender point near the point of the share, which was often thrown out of its place and broken by roots, stones, &c., getting under it.

We form the share with an inclined plane or guard, $e$, to elevate all roots and stones above the point $d$ of the colter. Thus on the landside edge of the point commences a rising cutter-edge, $e$, extending about one-third the length of the share and terminating abruptly at about three-fourths of an inch in height. In the rear of this is a deep angular groove, $i$, extending upward parallel with the landside, into which the lower edge of the colter is fitted, its point $d$ corresponding to the termination of the guard $e$ by which it is protected. The hook $c$ on the colter, which is much larger than usual, has its bed in a recess, $f$, in the upright or standard part $h$ of the mold-board, which is open on the landside, and of such form as to admit of its being readily fitted and laid in its proper position, and of such depth as to receive a covering-plate, $g$, which is secured by a bolt and nut; or the heel of the colter may be made of such thickness as to fit and fill flush with the landside, and be secured in the same manner as the covering-plate $g$. Thus the point and heel of the colter are made secure while in operation, and can readily be taken off, repaired, and replaced without disturbing the wood or iron work of the plow. Other shares are fitted to cover the holes in the mold-board with which the plow can be used with the knife or suspended cutter or without, as the nature of the soil and work may require.

The brace $k$ which we use is a round iron rod, which passes through the beam $j$ and land handle at the joint $j$, which is formed by passing a thin tenon through a mortise in the handle. The cheeks on the end of the beam corresponding to the tenon embrace the handle on each side. On the outer or landside end of the brace $k$ is a bolt-head, $j$, or nut and screw. On the inner side of the beam is a collar and nut, which is screwed hard against the beam. The rod thence passes through the mold-board handle, with a collar and nut on each side, by which the distance between the mold and landside handles may be increased or diminished, which will, with the assistance of a brace in the upper part of the handles, of similar construction, set the beam of the plow more or less to land, as may be requisite.

What we claim as our invention is as follows, viz:

1. The manner of securing and protecting the point of the colter by means of the inclined plane or guard, as above specified.

2. The manner of applying the locked colter by an opening on the landside and securing the same by a bolt and nut, whether made flush or covered by a plate, as above specified.

3. The manner of forming and applying the brace so as to secure the beam and land handle, unite with the mold-board handle, and adjust the position of the beam, as above specified.

In testimony that the within is a true specification of our invention we have hereto set our hands this 23d day of May, in the year of our Lord 1838.

DAVID PROUTY.
JOHN MEARS.

Witnesses:
A. H. FISKE,
JOHN W. PARKER.